(12) United States Patent
Fujii et al.

(10) Patent No.: US 12,563,069 B2
(45) Date of Patent: Feb. 24, 2026

(54) MALICIOUS WEBSITE LIFESPAN PREDICTION SYSTEM AND MALICIOUS WEBSITE LIFESPAN PREDICTION METHOD

(71) Applicant: Hitachi, Ltd., Tokyo (JP)

(72) Inventors: Shota Fujii, Tokyo (JP); Rei Yamagishi, Tokyo (JP); Tomohiro Shigemoto, Tokyo (JP); Takayuki Satou, Tokyo (JP)

(73) Assignee: HITACHI, LTD., Tokyo (JP)

( * ) Notice: Subject to any disclaimer, the term of this patent is extended or adjusted under 35 U.S.C. 154(b) by 250 days.

(21) Appl. No.: 18/462,751

(22) Filed: Sep. 7, 2023

(65) Prior Publication Data

US 2024/0323212 A1 Sep. 26, 2024

(30) Foreign Application Priority Data

Mar. 23, 2023 (JP) ................................. 2023-047167

(51) Int. Cl.
*H04L 9/40* (2022.01)
*G06F 17/18* (2006.01)

(52) U.S. Cl.
CPC .......... *H04L 63/1425* (2013.01); *G06F 17/18* (2013.01)

(58) Field of Classification Search
CPC .............................. H04L 63/1425; G06F 17/18
See application file for complete search history.

(56) References Cited

U.S. PATENT DOCUMENTS

2017/0195356 A1* 7/2017 Turgeman ............... H04L 63/08
2021/0021638 A1* 1/2021 Lancioni ............. H04L 63/1433

FOREIGN PATENT DOCUMENTS

JP 2016-45887 A 4/2016
JP 2016045887 A * 4/2016
WO WO-2014048751 A1 * 4/2014 ........... G06F 21/564

OTHER PUBLICATIONS

Nappa, A., Xu, Z., Rafique, M.Z., Caballero, J., and Gu, G.: CyberProbe: Towards Internet-Scale Active Detection of Malicious Servers, Proc. 2014 Network and Distributed System Security Symposium (NDSS2014), pp. 1-15(2014).
Soska, K. and Christin, N.: Automatically detecting vulnerable websites before they turn malicious, Proc. the 23rd USENIX conference on Security Symposium (SEC2014), pp. 625-640 (2014).

* cited by examiner

*Primary Examiner* — Anh Nguyen
(74) *Attorney, Agent, or Firm* — Volpe Koenig

(57) ABSTRACT

A malicious website lifespan prediction system includes a communication device that accesses a network, a storage device that stores information on malicious websites, and an arithmetic logic unit that observes predetermined events at the malicious websites, applies results of the observation to a decision rule defining a relationship between a tendency related to the predetermined event at the malicious website and a lifespan of the malicious website to predict the lifespan of the malicious website, and selects predetermined malicious websites from among the malicious websites according to the lifespan and generates a blocklist or a watchlist.

15 Claims, 14 Drawing Sheets

MALICIOUS WEBSITE LIST

112

| | CONNECTION DESTINATION | OBSERVATION SPAN INTERVAL | OBSERVATION DATE AND TIME | PREDICTED LIFESPAN |
|---|---|---|---|---|
| CONNECTION DESTINATION ID | 202 | 203 | 204 | 205 |
| 201 | | | | |
| 0 | search.example.com/ | 4 HOURS | 2023-01-01 04:00:00 | 120 HOURS |
| | | | 2023-01-01 00:00:00 | |
| 1 | 192.0.2.1/c2 | 30 MINUTES | 2023-01-01 04:00:00 | 48 HOURS |
| | | | 2023-01-01 03:30:00 | |
| | | | 2023-01-01 03:00:00 | |
| 2 | example.com/hoge | 2 HOURS | 2023-01-01 04:00:00 | 24 HOURS |
| ⋮ | | | | |

FIG. 2

OBSERVATION RESULTS STORAGE AREA

113

| CONNECTION DESTINATION ID | CONNECTION DESTINATION | OBSERVATION INTERVAL | STATUS CODE | CONTENTS |
|---|---|---|---|---|
| 301 | 302 | 303 | 304 | 305 |
| 0 | search.example.com | 2023-01-01 04:00:00 | 200 | 1.exe |
| | | 2023-01-01 00:00:00 | 404 | 404.html |
| 1 | 192.0.2.1/c2 | 2023-01-01 04:00:00 | 200 | 2.exe |
| | | 2023-01-01 03:30:00 | 200 | 2.exe |
| | | 2023-01-01 03:00:00 | 200 | 2.exe |
| 2 | example.com/hoge | 2023-01-01 04:00:00 | 404 | 404.html |
| ... | | | | |

FIG. 3

MALICIOUS WEBSITE LIFESPAN PREDICTION SYSTEM OVERALL PROCESSING FLOW

MALICIOUS WEBSITE OBSERVATION

LIFESPAN PREDICTION

SCREEN RENDERING

EXAMPLE MALICIOUS WEBSITE LIFESPAN PREDICTION RESULT RENDERING SCREEN 800

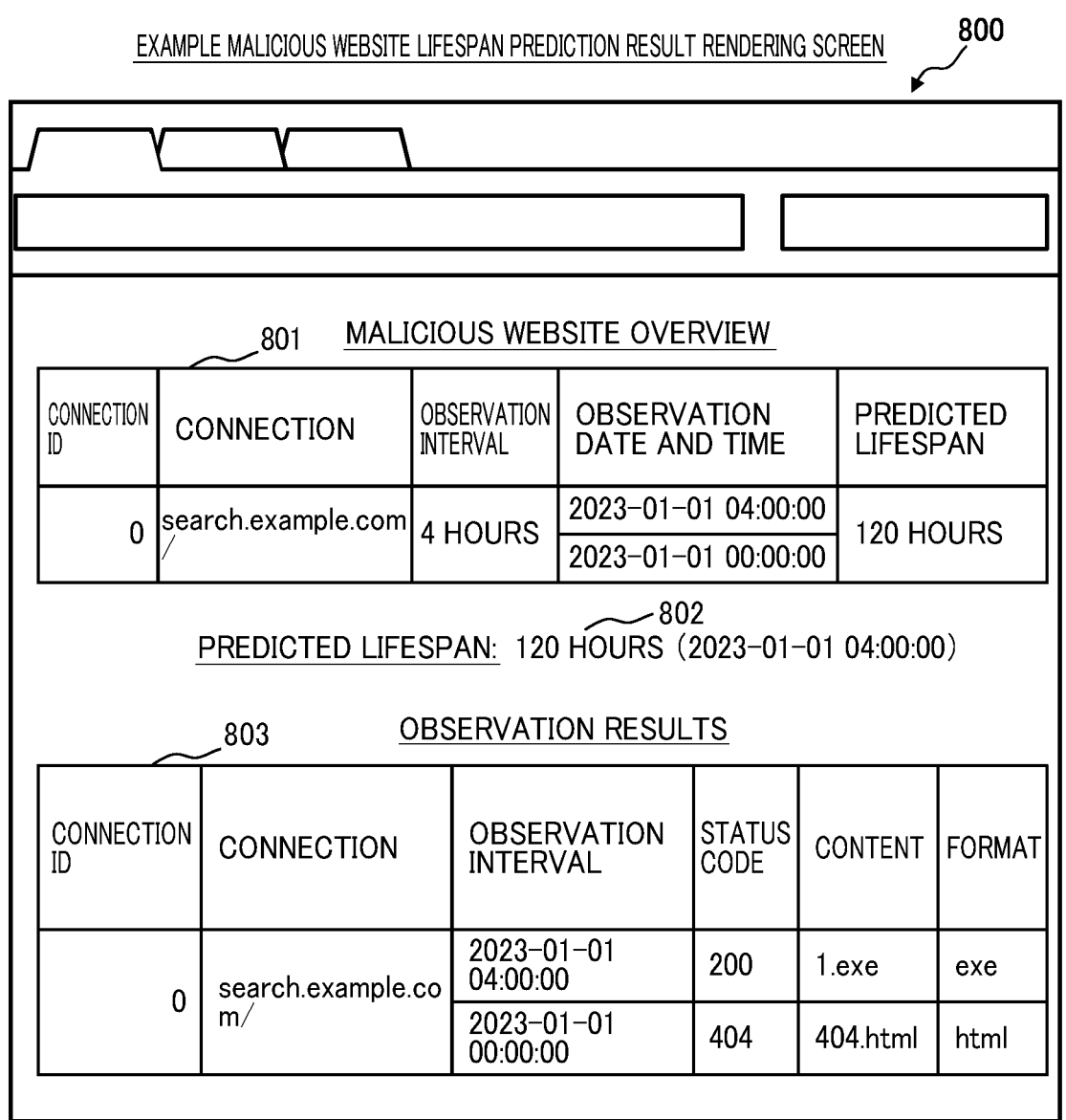

MALICIOUS WEBSITE OVERVIEW

801

| CONNECTION ID | CONNECTION | OBSERVATION INTERVAL | OBSERVATION DATE AND TIME | PREDICTED LIFESPAN |
|---|---|---|---|---|
| 0 | search.example.com/ | 4 HOURS | 2023-01-01 04:00:00<br>2023-01-01 00:00:00 | 120 HOURS |

802

PREDICTED LIFESPAN: 120 HOURS (2023-01-01 04:00:00)

OBSERVATION RESULTS

803

| CONNECTION ID | CONNECTION | OBSERVATION INTERVAL | STATUS CODE | CONTENT | FORMAT |
|---|---|---|---|---|---|
| 0 | search.example.com/ | 2023-01-01 04:00:00 | 200 | 1.exe | exe |
| | | 2023-01-01 00:00:00 | 404 | 404.html | html |

FIG. 8

LIST CONSTRUCTION

OBSERVATION INTERVAL SETTING

PROPERTY PREDICTION

BACKGROUND PREDICTION

MALICIOUS WEBSITE LIFESPAN PREDICTION SYSTEM AND MALICIOUS WEBSITE LIFESPAN PREDICTION METHOD

TECHNICAL FIELD

The present invention relates to a malicious website lifespan prediction system and malicious website lifespan prediction method.

BACKGROUND ART

Blocking malicious websites is effective in limiting the damage therefrom. In addition, regular observation of such malicious websites is useful for analyzing attacks and detecting signs of attack.

For just this reason, there are services that provide blocklists of malicious websites as well as monitoring services. In addition, as a method of blocking communication with malicious websites, there is communication control using a blocklist, implemented in layers such as the forward proxy layer. Malicious websites with which it is desirable to block communication are registered in advance, and when communication that matches the list is detected, the communication is blocked to limit the damage.

As a conventional technique for dealing with such malicious websites, for example, a technique like that of Japanese Patent Application Publication No. 2016-45887 that enables detection of access to an unknown malicious website as well as reduces the burden of detection has been proposed.

The technique proposed involves a monitoring system having an observation device and an analysis device that is connected to the observation device via a communication line. The observation device includes a data observation unit that collects information about user access to web pages and a transmission unit that transmits information collected by the data observation unit to the analysis device. The analysis device includes a reception unit that receives information transmitted from the observation device, an analysis unit that detects a specific page transition method based on information received by the reception unit and determines whether content downloaded from accessing the web page is malicious based on the detection result of the specific page transition method, and an analysis target determination unit that sets as an analysis target only that content which is suspected of being malignant by the analysis unit.

PRIOR ART DOCUMENTS

Patent Literature

Patent Document 1: Japanese Patent Application Publication No. 2016-45887.

Non-Patent Literature

Non-Patent Document 1: Nappa, A., Xu, Z., Rafique, M. Z., Caballero, J., and Gu, G.: CyberProbe: Towards Internet-Scale Active Detection of Malicious Servers, Proc. 2014 Network and Distributed System Security Symposium (NDSS2014), pp. 1-15(2014). www.google.com/url?sa=t&rct=j&q=&esrc=s&source=web&cd=&ved=2ahUKEwiGmd-DOtD8AhXbZt4K HUyqCQoQFnoECAUQAQ&url=https %3A %2F %2Flirias.kuleuven.be %2Fr etrieve %2F384185&usg=AOvVaw3rKJj5M IzX684yxfDdtlzk Non-Patent Document 2: Soska, K. and Christin, N.: Automatically Detecting Vulnerable Websites before They Turn Malicious, Proc. the 23rd USENIX conference on Security Symposium (SEC2014), pp. 625-640 (2014). www.usenix.org/conference/usenixsecurity14/ technical-sessions/presentation/soska

SUMMARY

Problem to be Solved

However, the number of malicious websites is astronomical and increases day by day. As a result, it is unrealistic to attempt to block or observe all such sites.

Instead, it is necessary to pare down such blocklists and watchlists to higher priority items based on the situation at the time, but such an approach is costly to implement and highly dependent on personnel.

In the conventional art, there are methods of monitoring websites and detecting malicious websites from page transition information or the like. However, it has not been proposed to provide information on lifespan that contributes to the inventorying and/or selection of malicious websites to block and/or observe.

In addition, there are also other techniques for detecting active malicious websites through observation. However, it is beyond the scope of these techniques to provide information on the nature and lifespan of malicious websites.

In short, as described above, although there are many conventional technologies focused on monitoring malicious websites, no technology has been proposed for the purpose of inventorying and/or selecting malicious websites to be blocked and/or observed. As a result, it has not been possible to solve the aforementioned problems of high operating costs and personnel-related dependency skill related to the blocklist and the watchlist.

Accordingly, it is an object of the of the present invention to provide a technology capable of reducing the operating costs and personnel-related dependency involved in the construction of the blocklist and the watchlist by predicting the lifespan of malicious websites.

Solution to the Problem

To solve the above-described problem, a malicious website lifespan prediction system of the present invention comprises a communication device that accesses a network; a storage device that stores information on malicious websites in the network; and a arithmetic logic unit that accesses each of the malicious websites and observes a predetermined event at the malicious websites, applies results of the observation to a decision rule defining a relationship between a tendency related to the event at the malicious website and a lifespan of the malicious website to predict the lifespan of the malicious website, and selects predetermined malicious websites from among the malicious websites according to the lifespan and generates a blocklist or a watchlist.

Further, a malicious website lifespan prediction method of the present invention comprises an information processing apparatus including a communication device that accesses a network and a storage device that stores information on each malicious website in the network, and which accesses each of the malicious websites and observes a predetermined event at the malicious websites, applies results of the observation to a decision rule defining a relationship between a tendency related to the event at the malicious website and a lifespan of the malicious website to predict the lifespan of the malicious website, and selects predetermined malicious websites from among the malicious websites according to the lifespan and generates a blocklist or a watchlist.

Advantageous Effects of the Invention

According to the present invention, by predicting the lifespan of a malicious website, it is possible to reduce the operational costs and personnel-related dependency involved in constructing the blocklist and the watchlist.

BRIEF DESCRIPTION OF THE DRAWINGS

FIG. 2 is a diagram illustrating an example of a malicious website list according to the first embodiment of the present invention;

FIG. 3 is a diagram illustrating an example of an observation results storage area according to the first embodiment of the present invention;

FIG. 8 is a diagram illustrating an example of a screen according to the first embodiment of the present invention;

DETAILED DESCRIPTION OF THE EMBODIMENTS

Figure 1:
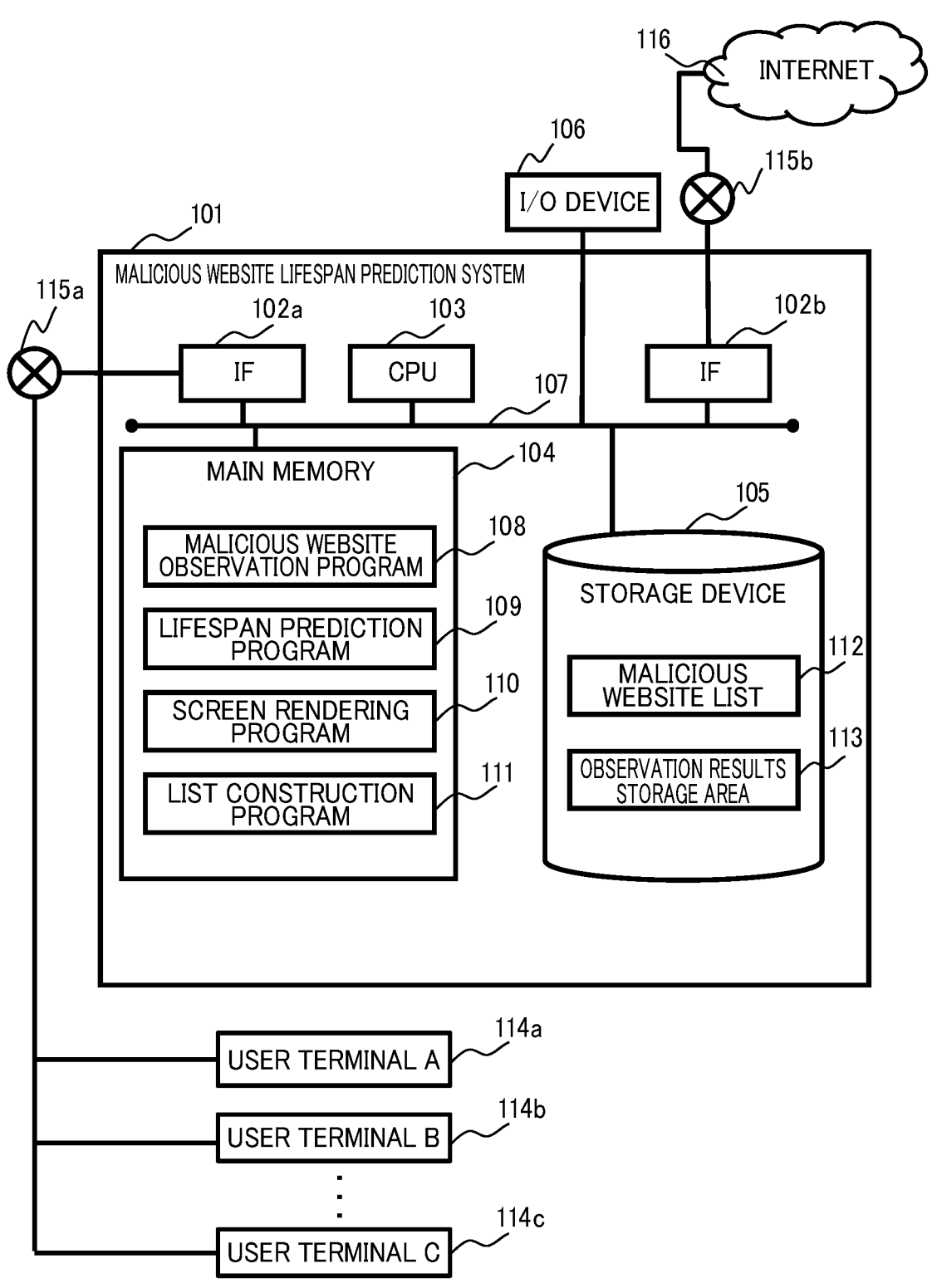
FIG. 1 is a diagram illustrating a configuration example of a malicious website lifespan prediction system according to a first embodiment of the present invention.

Hereinafter, embodiments of the present invention will be described with reference to the drawings. However, the present invention is not to be construed as being limited to the embodiments described herein. Those skilled in the art will easily understand that the specific configurations described below can be changed without departing from the scope and spirit of the present invention.

In the configurations of the invention described below, the same or similar configurations or functions are denoted by the same reference numerals and redundant descriptions are omitted.

Notations such as "first", "second", "third", etc., in this specification are attached in order to identify constituent elements, and do not necessarily limit the number or order of such elements.

To facilitate an understanding of the invention, for convenience the position, size, shape, range, etc., of each component shown in the drawings may not represent the actual position, size, shape, range, etc. of such component. Therefore, the present invention is not limited to the positions, sizes, shapes, ranges, etc., disclosed in the drawings and the like.

First Embodiment

A first embodiment of the present illustrates the processing executed by a malicious website lifespan prediction system in the case of reducing the operating costs and personnel-related dependency involved in constructing the blocklist and the monitor list by predicting the lifespans of malicious websites on-premises.

Network Configuration

Embodiments of the present invention are described in detail below with reference to the drawings. FIG. 1 is a network configuration diagram including a malicious website lifespan prediction system 101 of the present embodiment.

The malicious website lifespan prediction system 101 illustrated in FIG. 1 is a computer system that can reduce the operating costs and personnel-related dependency involved in constructing the blocklist and watchlist by predicting the lifespans of malicious websites.

A malicious website lifespan prediction system 101 according to the first embodiment is connected to a user terminal 114 operated by a user via the internet 116 and a network 115. Accordingly, the system including the user terminal 114 may be regarded as a malicious website lifespan prediction system.

The malicious website lifespan prediction system 101 includes a Central Processing Unit (CPU) 103, a main memory 104, a storage device 105, an interface (IF) 102, an input/output (I/O) device 106, and a communication path 107 connecting these devices.

Of these, the IF 102 is a communication device for communicating with other devices such as the user terminal 114.

In addition, the CPU 103 observes malicious websites by executing a malicious website observation program 108 stored in the main memory 104; predicts the lifespan of a connection by executing a lifespan prediction program 109; outputs the processing results from each of the above-described programs (observation results, information such as the degree of malignancy and treatment priority) by executing a screen rendering program 110; and implements functions for blocking malicious sites and generating an observation list by executing a list construction program 111.

The main memory 104 is composed of a volatile memory element for storing data necessary for the CPU 103 to execute processing.

The storage device 105 is composed of a non-volatile storage element such as a hard disk drive or a flash memory capable of storing a large amount of data.

The I/O device 106 is a device for inputting/outputting data, such as a keyboard and a display.

The communication path 107 is an information transmission medium such as a bus or cable that connects the above-described devices.

The storage device 105 described above stores a malicious website list 112 for managing malicious websites and an observation results storage area 113 for storing observation results.

Each of the above programs and data may be stored in the main memory 104 or the storage device 105 in advance, or may be installed (loaded) from the (I/O) device 106 or from another device via the IF 102 as necessary.

Note that the configuration of the malicious website lifespan prediction system illustrated in FIG. 1 is an example thereof, and as such is not limited thereto.

Data Structure Example

Next, various types of information used by the malicious website lifespan prediction system 101 of the present embodiment are described. FIG. 2 is a diagram illustrating an example of the malicious website list 112.

As illustrated in FIG. 2, the malicious website list 112 includes, for example, a connection destination ID 201, a connection destination 202, an observation interval 203, an observation date and time 204, and a predicted lifespan 205.

The connection destination ID 201 is a field that stores identification information for uniquely identifying the connection destination to be observed. In the connection destination ID 201 of the first embodiment, a number is stored as identification information.

The connection destination 202 is a field that stores the URL of the connection destination to be observed. For example, the connection destination corresponding to the entry with the connection destination ID 201 of "0" is "search.example.com/".

The observation interval 203 represents the frequency with which the connection destination is observed. For example, the entry for the connection destination ID 201 of "0" indicates that observation is attempted every four hours.

The observation date and time 204 indicates the date and time when the connection destination was observed. For example, among the entries for the connection destination ID 201 of "0", the most recent observation was performed at 04:00:00 on Jan. 1, 2023. In the present invention, there is no limitation on the data format of the time stored in the observation date and time 204. Any data format, such as Unixtime, may be used, as long as it is a data format from which the time can be determined.

The predicted lifespan 205 represents the lifespan predicted for (the malicious website of) the connection destination. For example, for the connection destination ID 201 of "0", the result of observation at the latest time of "04:00:00 on Jan. 1, 2023" is used to represent the predicted lifespan from that point in time.

Note that the malicious website list described with reference to FIG. 2 is an example thereof, and as such is not limited thereto.

FIG. 3 is a diagram illustrating an example of the observation results storage area 113. As illustrated in FIG. 3, the observation results storage area 113 includes, for example, a connection destination ID 301, a connection destination 302, an observation date and time 303, a status code 304, and a content 305.

The connection destination ID 301 is a field that stores identification information for uniquely identifying the connection destination to be observed. In the connection destination ID 301 of the first embodiment, a number is stored as identification information.

The connection destination 302 is a field that stores the URL of the connection destination to be observed. For example, the connection destination corresponding to the entry with the connection destination ID 301 of "0" is "search.example.com/".

The observation date and time 303 indicates the date and time when the connection destination was observed. For example, among the entries for the connection destination ID 301 of "0", the most recent observation was performed at "04:00:00 on Jan. 1, 2023". In the present invention, there is no limitation on the data format of the time stored in the observation date and time 303. Any data format, such as Unixtime, may be used, as long as it is a data format from which the time can be determined.

The status code 304 is a field for storing the status code of the connection destination at the time of observation. For example, the example illustrated in FIG. 3 indicates that the status code was "200" when the connection destination with the connection destination ID 301 of "0" was observed at "04:00:00 on Jan. 1, 2023". The status code is a code returned by the destination server as an HTTP response, and includes types such as an information response, a success response, a redirect message, a client error response, and a server error response.

The content 305 is a field for storing content obtained from the connection destination at the time of observation. For example, the example illustrated in FIG. 3 indicates that the content obtained when the connection destination with the connection destination ID 301 of "0" was observed at "04:00:00 on Jan. 1, 2023" was "1.exe". Note that the information stored as the observation results is not limited to that shown in the example of FIG. 3.

Note that the observation results storage area described with reference to FIG. 3 is an example, and as such is not limited thereto.

Flow Example: Overall Flow

The actual procedure of the malicious website lifespan prediction method according to the present embodiment is described below with reference to the drawings. Various operations corresponding to the malicious website lifespan prediction method described below are implemented by a program that the malicious website lifespan prediction system 101 reads into a memory or the like and executes. This program is composed of code for performing the various operations described below.

Figure 4:
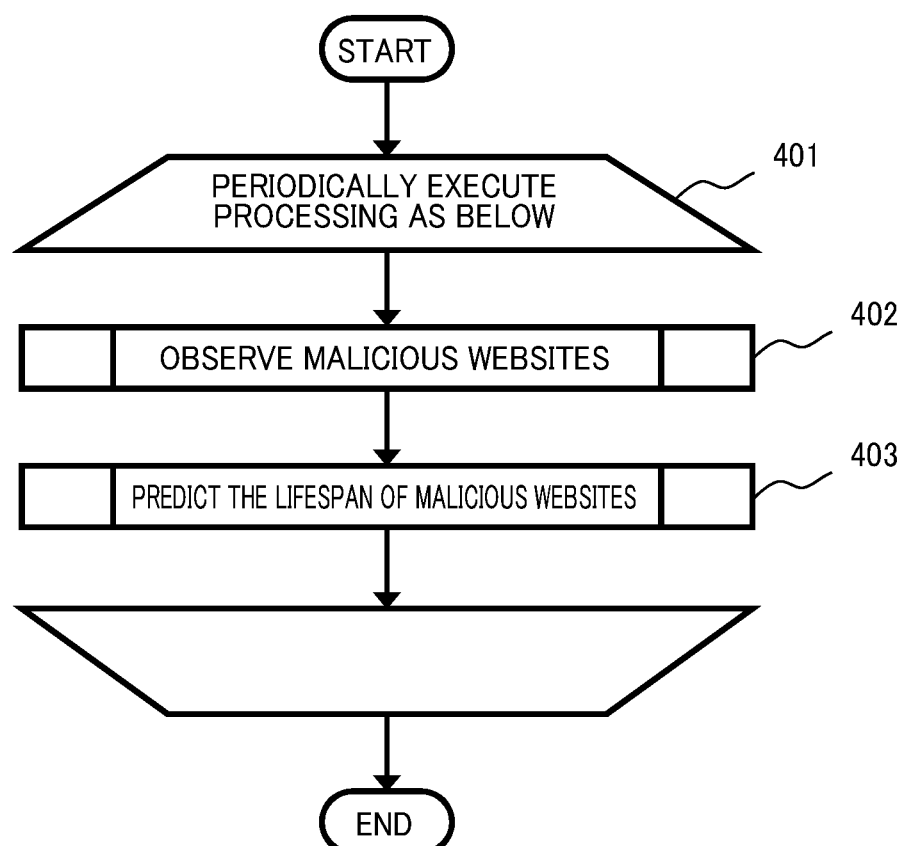
FIG. 4 is a flowchart illustrating an overall processing flow according to the first embodiment of the present invention.

FIG. 4 is a flowchart illustrating a processing flow according to the first embodiment of the present invention, and more specifically, a flowchart for explaining the overall processing executed by the malicious website lifespan prediction system 101.

Here, the malicious website lifespan prediction system 101 periodically executes the processing described below (step 401).

First, the malicious website lifespan prediction system 101 observes malicious websites (step 402). A detailed flow regarding this malicious website observation is described later using FIG. 5.

Next, the malicious website lifespan prediction system 101 predicts the lifespan of the malicious websites using the observation results obtained in step 402 (step 403). A detailed flow of this lifespan prediction is described later using FIG. 6

The malicious website lifespan prediction system 101 performs the above processing for all malicious websites, and ends the flow.

Note that the processing flow of the malicious website lifespan prediction system described with reference to FIG. 4 is an example, and as such is not limited thereto.

Flow Example: Malicious Website Observation

Figure 5:
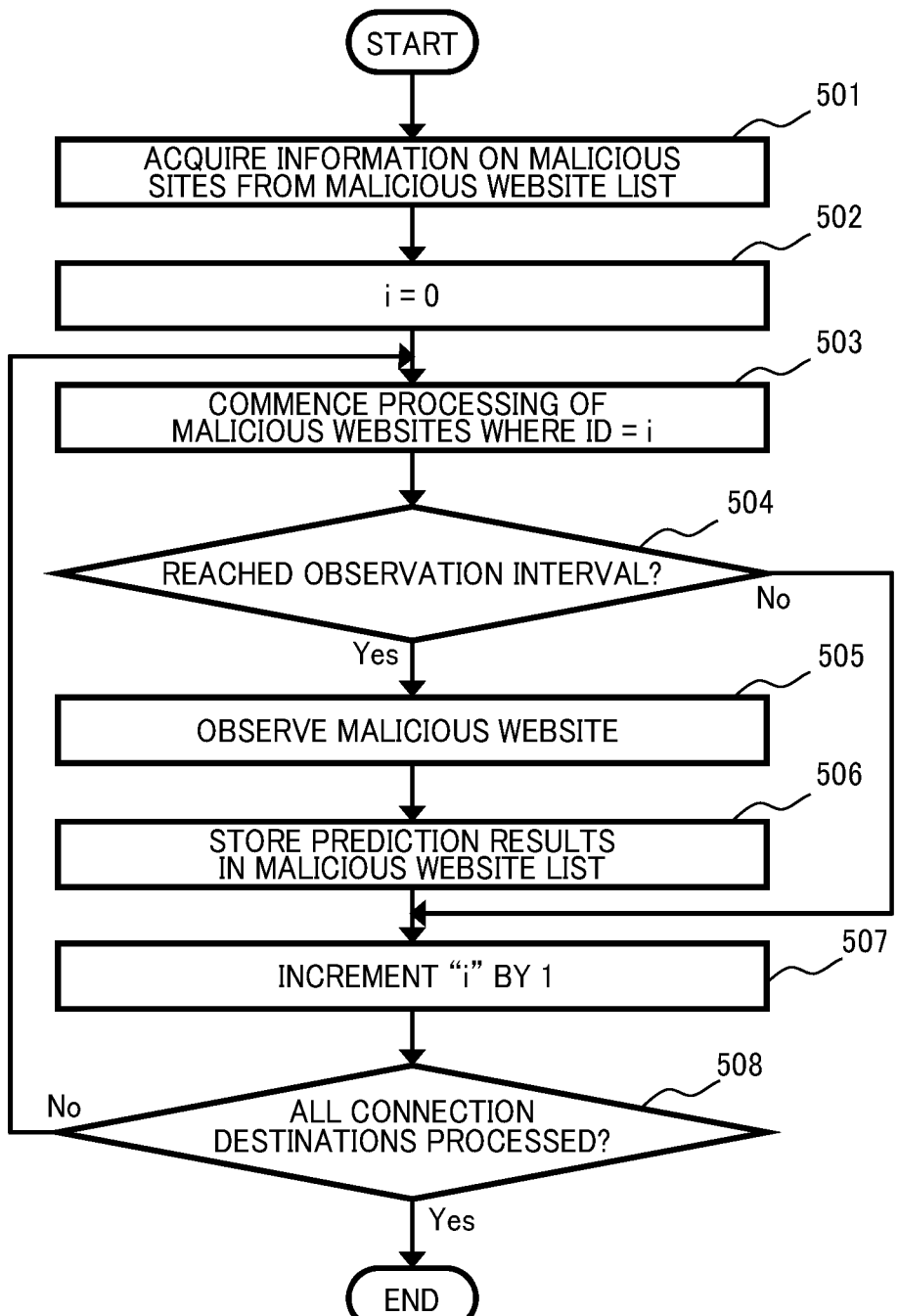
FIG. 5 is a flowchart illustrating a malicious website observation process according to the first embodiment of the present invention.

FIG. 5 is a flowchart for explaining an example of the malicious website observation process (step 402 described above) executed by the malicious website lifespan prediction system 101 of the first embodiment.

The malicious website observation program 108 executed by the CPU 103 starts the process described below when, for example, an execution instruction is received from the user terminal 114.

The malicious website observation program 108 acquires a list of connection destinations to be observed from the malicious website list 112 (step 501). Here, it is assumed that a list including entries composed of connection destination IDs 201 is acquired.

Next, the malicious website observation program 108 sets the initial value of the variable "i"", which is the connection destination ID of the malicious website list 112, to "0" (step 502).

Next, the malicious website observation program 108 starts processing the connection destination with the connection destination ID of i (step 503).

Next, the malicious website observation program 108 refers to the observation date and time 204 and the observation interval 203 for the most recent entry in the malicious website list 112 and calculates the elapsed time from the last observation date and time of the connection destination to program execution, by which it determines whether or not the connection destination has reached the observation interval (step 504).

Based on this determination, if the connection destination has not reached the observation interval (step 504: NO), the malicious website observation program 108 terminates processing related to the connection destination and proceeds to step 507.

On the other hand, if the connection destination has reached the observation interval as a result of the above determination (step 504: YES), the malicious website observation program 108 proceeds to step 505.

Next, the malicious website observation program 108 observes the connection destination (step 505). For this observation, for example, a browser is used to access the connection destination and obtain a response result. As an example of the response result, the aforementioned status code can be assumed.

Next, the malicious website observation program 108 stores the observation results obtained in step 505 in the entry corresponding to the connection destination ID of the connection destination in the observation results storage area 113 (step 506).

Next, the malicious website observation program 108 adds 1 to the variable "i" (step 507) and proceeds to step 508.

Next, the malicious website observation program 108 compares the variable "i" with the number of connection destinations that can be obtained by referring to the malicious website list 112.

As a result of this comparison, if the variable "i" is less than the number of connection destinations (step 508: NO), the malicious website observation program 108 returns to step 503.

On the other hand, if the variable "i" exceeds the number of connection destinations as a result of the above-described comparison (step 508: YES), the malicious website observation program 108 terminates the process (step 508).

Note that the method of malicious website observation processing described with reference to FIG. 5 is an example, and as such is not limited thereto.

Flow Example: Lifespan Prediction

Figure 6:
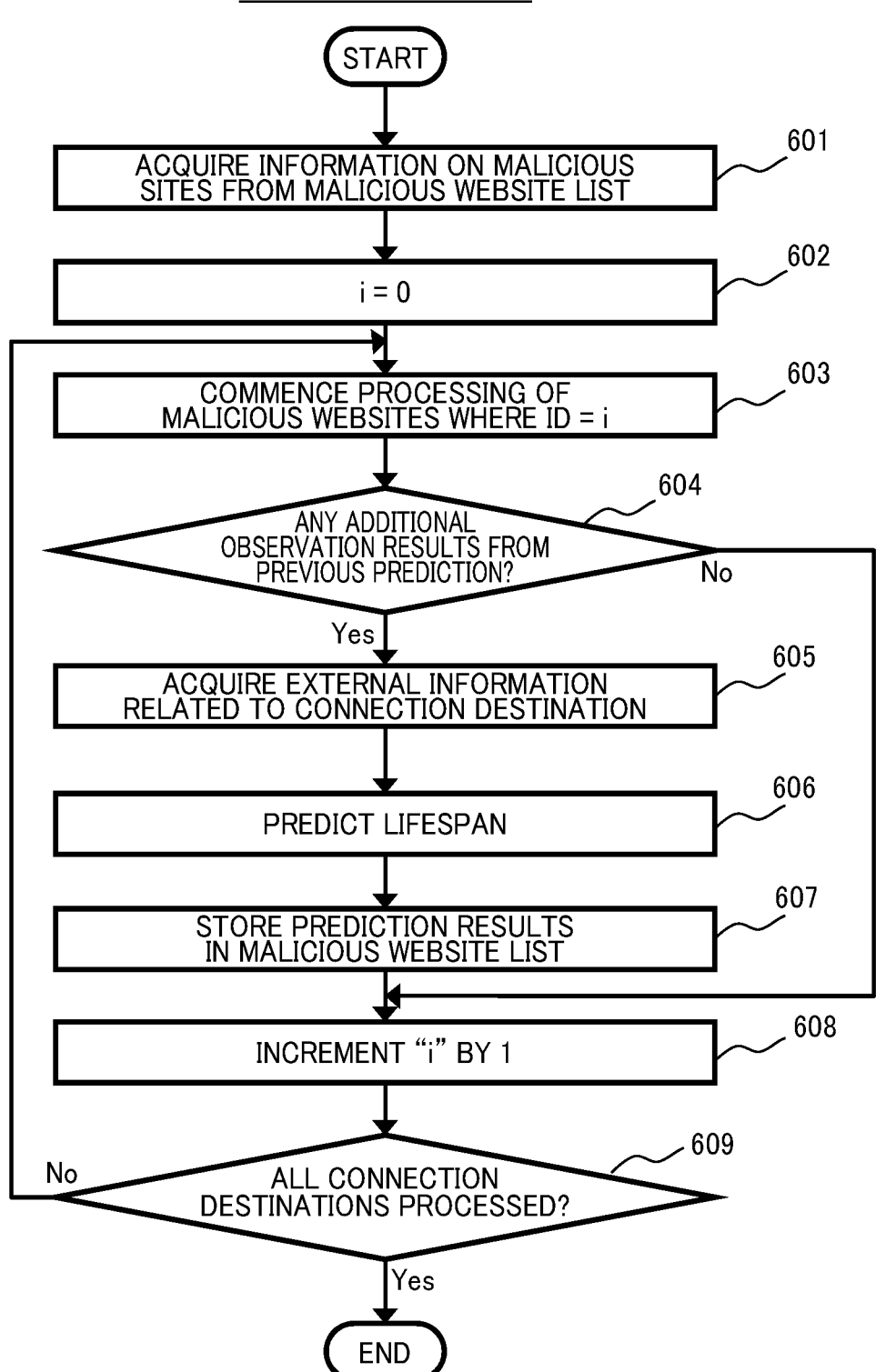
FIG. 6 is a flowchart illustrating a lifespan prediction process according to the first embodiment of the present invention.

FIG. 6 is a flowchart for explaining an example of lifespan prediction processing executed by the malicious website lifespan prediction system 101 of the first embodiment.

The lifespan prediction program 109 executed by the CPU 103 starts the process described below when an execution instruction is received from the user terminal 114.

The lifespan prediction program 109 acquires a list of connection destinations to be observed from the malicious website list 112 (step 601). Here, it is assumed that a list including entries composed of connection destination IDs 201 is acquired.

Next, the lifespan prediction program 109 sets the initial value of the variable "i", which means the connection destination ID of the malicious website list 112, to 0 (step 602).

Next, the lifespan prediction program 109 starts processing the connection destination with the connection destination ID of i (step 603).

Next, the lifespan prediction program 109 refers to the observation results storage area 113 and confirms whether there are any additional observation results from the previous prediction for the connection destination (step 604).

At this time, if there are no additional observation results (step 604: NO), the lifespan prediction program 109 terminates the process regarding the connection destination and proceeds to step 608.

On the other hand, if there are additional observation results (step 604: YES), the lifespan prediction program 109 proceeds to step 605.

Next, the lifespan prediction program 109 acquires external information related to the connection destination (step 605), such as WHOIS, DNS, certificate information, etc.

Next, the lifespan prediction program 109 applies the observation results obtained from the observation results storage area 113 and the external information obtained in step 605 to predetermined decision rules (e.g., an engine or the like that has machine-learned the relation between tendencies related to predetermined events at a malicious website and the lifespan of that malicious website) and predicts the lifespan of the connection destination (step 606).

Note that the aforementioned events can be various things, such as the type of status code that is a response from the malicious website, the role of the malicious website, external information such as WHOIS, and the like.

Next, the lifespan prediction program 109 stores the predicted lifespan obtained in step 606 in the predicted lifespan 205 of the entry corresponding to the connection destination ID of the connection destination in the malicious website list 112 (step 607).

Next, lifespan prediction program 109 adds 1 to the variable "i" (step 608) and proceeds to step 609.

Next, the lifespan prediction program 109 compares the variable "i" with the number of connection destinations that can be obtained by referring to the malicious website list 112 (step 609).

As a result of the aforementioned comparison, if the variable "i" is less than the number of connection destinations (step 609: NO), the lifespan prediction program 109 returns to step 603.

Alternatively, if the variable "i" exceeds the number of connection destinations as a result of the above-described comparison (step 609: YES), the lifespan prediction program 109 terminates the process (step 609).

It should be noted that the lifespan prediction processing method described with reference to FIG. 6 is one example, and as such is not limited thereto. For example, the lifespan of the connection destination may be predicted using information other than that described in the foregoing example. Further, the observation interval may be varied based on the predicted properties of the connection destination. For example, observations can be made at short intervals for entities whose properties can change in a short period of time, and at long intervals for entities that live for a long time but do not change their properties during that time period.

Flow Example: Screen Rendering

Figure 7:
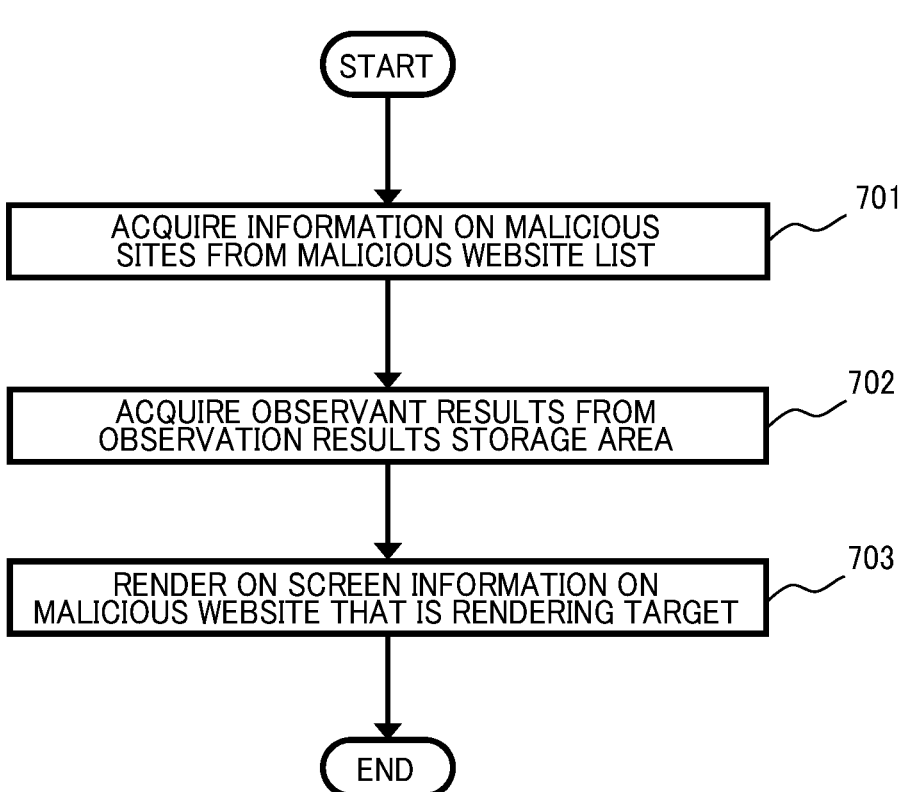
FIG. 7 is a flowchart illustrating a screen rendering process according to the first embodiment of the present invention.

In addition to the processing described with reference to FIG. 4, the malicious website lifespan prediction system 101 executes screen rendering processing for displaying various information to the user. Thus, FIG. 7 is a flowchart illustrating an example of a screen rendering process executed by the malicious website lifespan prediction system 101 of the first embodiment.

The screen rendering program 110 executed by the CPU 103 starts the process described below when an execution instruction is received from the user terminal 114.

The screen rendering program 110 acquires a list of connection destinations to be observed from the malicious website list 112 (step 701). Here, it is assumed that a list including entries composed of connection destination IDs 201 is obtained.

The screen rendering program 110 acquires the observation results of the connection destinations from the observation results storage area 113 (step 702). Here, it is assumed that a list including entries composed of connection destination IDs 301 is obtained.

The screen rendering program 110 generates screen data with information about the connection destination to be rendered, distributes it to the user terminal 114 and displays it (step 703), and terminates the process.

It should be noted that the screen rendering method described with reference to FIG. 7 is an example thereof, and as such is not limited thereto.

FIG. 8 is an example of a malicious website lifespan prediction result rendering screen 800 generated by the screen rendering program 110 in the malicious website lifespan prediction system 101 of the first embodiment and displayed on the user terminal 114.

The screen 800 in FIG. 8 includes a malicious website overview 801, a predicted lifespan 802, and observation results 803.

Of these, the malicious website overview 801 indicates basic information about the connection destination to be depicted. For example, information such as connection destination ID, connection destination, observation interval, observation date and time, and predicted lifespan are included.

The predicted lifespan 802 is the result of predicting the lifespan of the connection destination.

The observation results 803 are the results of observing the connection destination to be depicted, and include information such as connection destination ID, connection destination, observation date and time, status code, content, and format, for example.

The above-mentioned content can be assumed to be downloadable files provided by malicious websites, screen data including status codes, and the like.

As described above, by displaying the predicted lifespan of the connection destination, it is expected that analysts and other users will be assisted in creating watchlists and blocklists.

It should be noted that although the rendering screen is exemplified this time based on the execution result of each program according to the first embodiment, it is only an example and as such is not limited thereto. Thus, for example, any information can be depicted in any format as long as it is related to the destination.

Flow Example: Blocklist Provision

Figure 9:
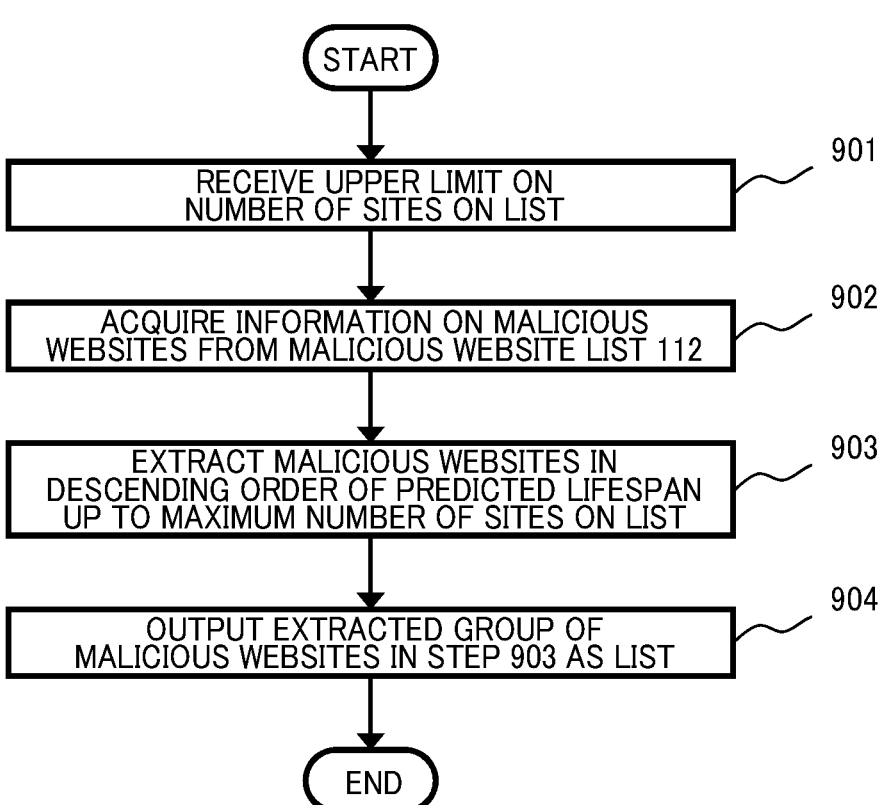
FIG. 9 is a flowchart illustrating a list construction process according to the first embodiment of the present invention.

Separately from the processing described with reference to FIG. 4, the malicious site lifespan prediction system 101 also executes a list construction process. FIG. 9 is a flowchart illustrating an example of a blocklist provision process executed by the malicious website lifespan prediction system 101 of the first embodiment.

The list construction program 111 executed by the CPU 103 starts the process described below when an execution instruction is received from the user terminal 114.

The list construction program 111 receives specification of an upper limit on the number of sites on the list from the user's user terminal 114 (step 901).

The list construction program 111 acquires information on malicious websites from the malicious website list 112 (step 902).

In addition, from the malicious website list 112 the list construction program 111 extracts malicious websites in descending order of predicted lifespan up to the maximum number of sites accepted in step 901 (step 903).

The list construction program 111 outputs the group of malicious websites extracted in step 903 as a blocklist (step 904), and terminates the process. At this time, it is conceivable to cooperate via the IF 102 with another device, for example, a network device that has the function of blocking actual communications.

It should be noted that the list construction method described with reference to FIG. 9 is an example, and as such is not limited thereto. For example, the list may be constructed taking into consideration other factors such as the degree of malignancy of the connection destination, in addition to the predicted lifespan.

In addition, the list may be created taking into consideration where the list is used. For example, when monitoring malicious websites, it is desirable to obtain as many types of monitoring results as possible, so measures such as prioritizing adding to the malicious website list those that change their content one after another as a watchlist can be considered. In addition, although in the above example the user entered the upper limit for the list, but using the predicted lifespan and taking into consideration resources such as the capacity of the blocklist and the observable number of the observation system, the blocklist may also be equipped with functions to maximize the blocking performance of the blocklist and the observation capability of the watchlist.

While it is useful to block or observe malicious websites, it is unrealistic to block or monitor all of them because the number of malicious websites is astronomical and increases day by day. For this reason, it has been necessary to construct blocklists and watchlists focusing on just the higher-priority entities based on the state of affairs at any given time, etc., with consequent high implementation costs and high degree of personnel-related dependency.

According to the first embodiment, the malicious website lifespan prediction system 101 predicts the lifespan of a malicious website and uses the results to automatically construct a blocklist and a watchlist. As a result, it is expected that the operating costs and the personnel-related dependence involved in the construction of the blocklist and the watchlist will be reduced.

Second Embodiment

A second embodiment relates to the processing of a malicious website lifespan prediction system that has support functions related to observation and analysis of malicious websites and enables more sophisticated and labor-saving analysis. The second embodiment is described below, focusing on the differences from the first embodiment.

Figure 10:
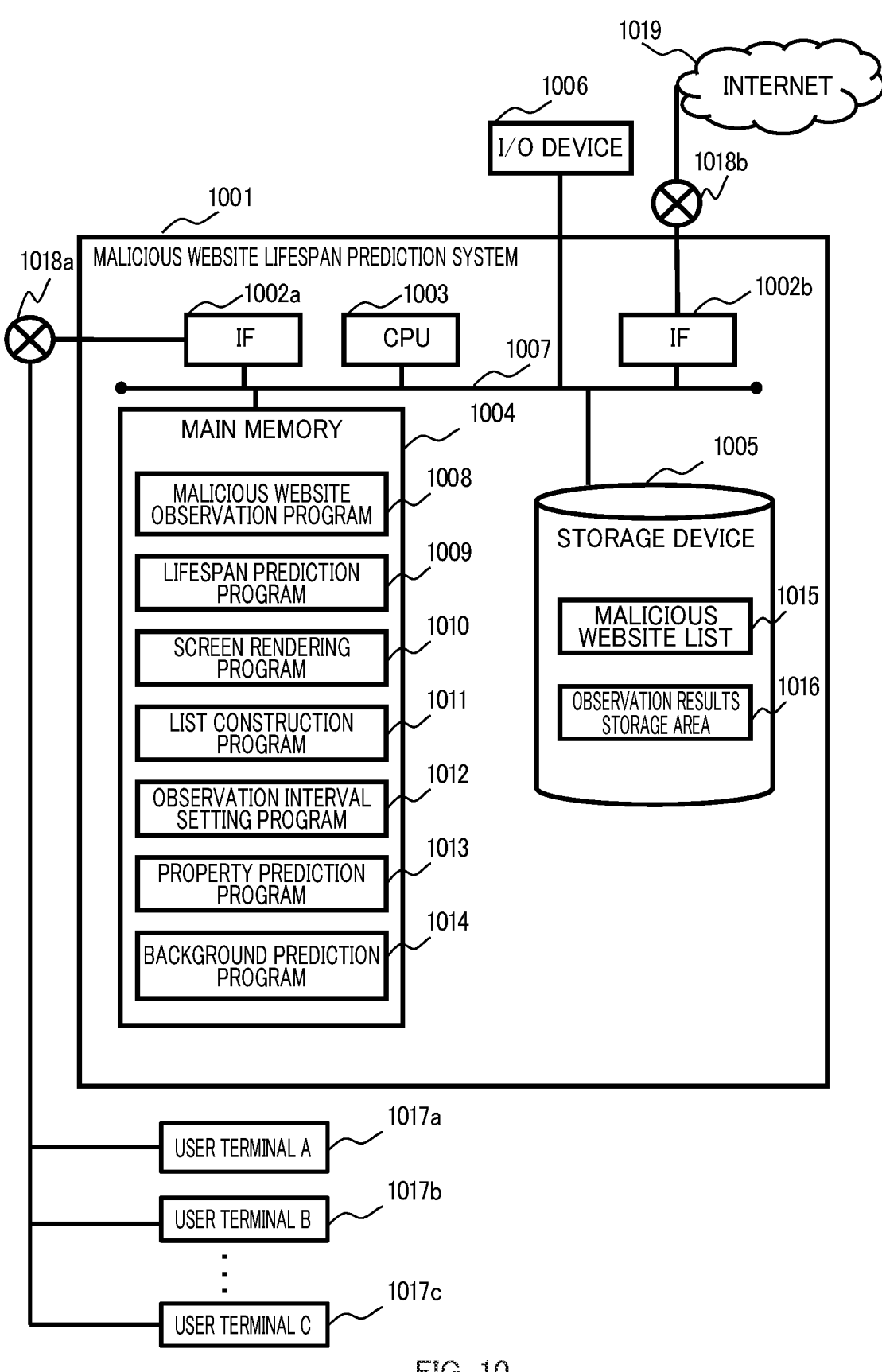
FIG. 10 is a diagram illustrating a configuration example of a malicious website lifespan prediction system according to a second embodiment of the present invention.

FIG. 10 is a diagram illustrating a configuration example of a malicious website lifespan prediction system 1001 according to the second embodiment of the present invention. The configuration of the computer system of the second embodiment is the same as that of the first embodiment. Moreover, the hardware configuration of the malicious website lifespan prediction system of the second embodiment is the same as that of the first embodiment.

As a program configuration of the second embodiment, in addition to that of the first embodiment, malicious website lifespan prediction system 1001 has an observation interval determination program 1012, a property prediction program 1013, and a background prediction program 1014 are provided. Further, the processing of/executed by the malicious website observation program 1008, lifespan prediction program 1009, screen rendering program 1010, and list construction program 1011 of the second embodiment is the same as that of the first embodiment.

The data structure of the second embodiment is the same as that of the first embodiment.

Note that the configuration of the malicious website lifespan prediction system according to the second embodiment described with reference to FIG. 10 is an example, and as such is not limited thereto.

Flow Example: Observation Interval Determination

Figure 11:
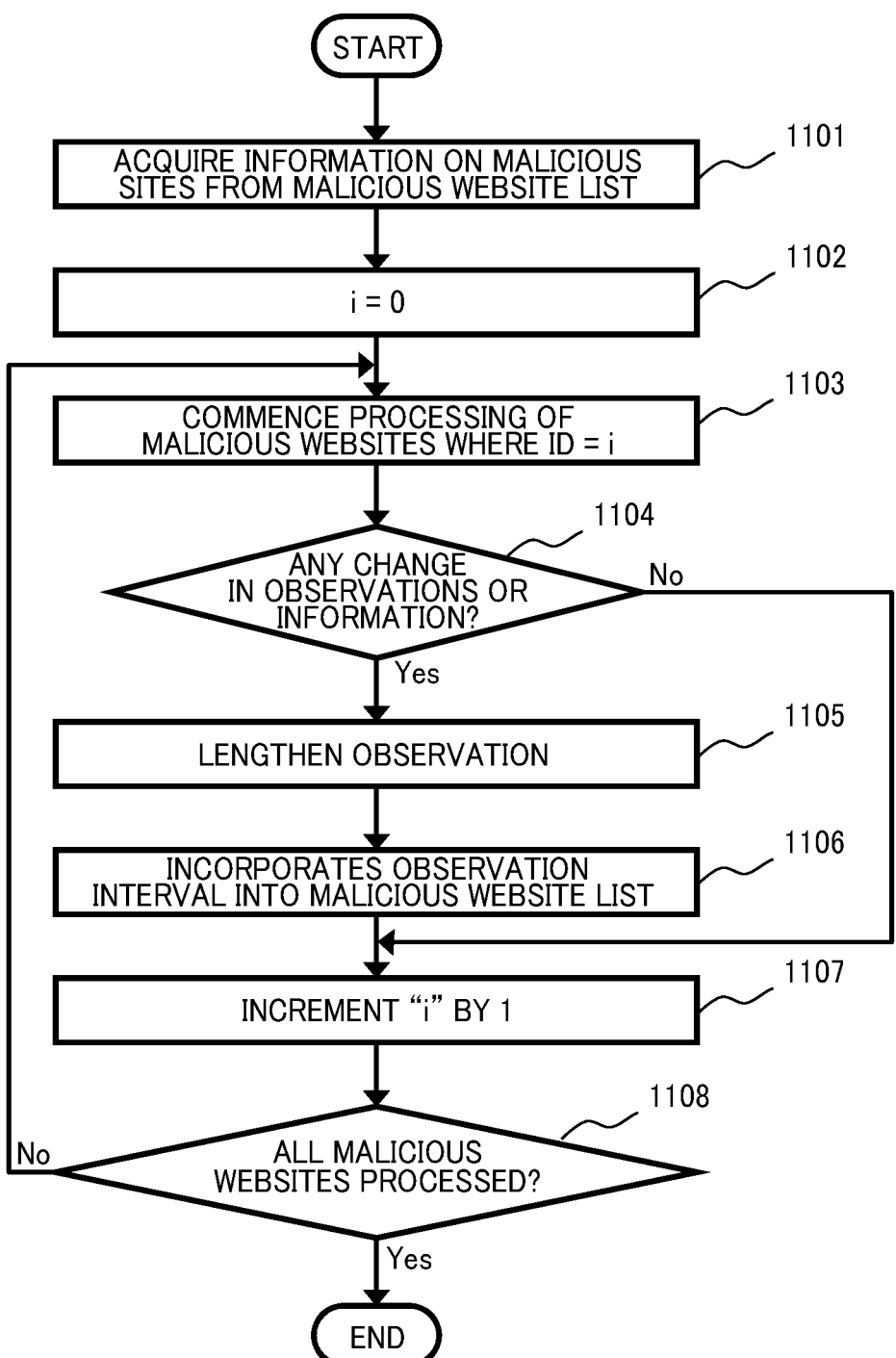
FIG. 11 is a flowchart illustrating an observation interval setting process according to the second embodiment of the present invention.

FIG. 11 is a flowchart illustrating an example of an observation interval setting process executed by the malicious website lifespan prediction system 1001 of the second embodiment.

When an execution instruction is received from the user terminal 114, the observation interval determination program 1012 executed by a CPU 1003 starts the process described below.

The observation interval determination program 1012 acquires a list of connection destinations to be observed from the malicious website list 1015 (step 1101). Here, it is assumed that a list including entries composed of connection destination IDs is acquired.

Next, the observation interval determination program 1012 sets the initial value of the variable "i", which means the connection destination ID of the malicious website list 1015, to "0" (step 1102).

Next, the observation interval determination program 1012 starts processing the connection destination with the connection destination ID of i (step 1103).

Next, the observation interval determination program 1012 refers to the observation results storage area 1016 and confirms whether there is any change in the observation results or external information for the connection destination (step 1104).

Based on the confirmation described above, if there is a change (step 1104: YES), the observation interval determination program 1012 terminates processing related to the connection destination and proceeds to step 1107. FIG.

On the other hand, if there is no change as a result of the confirmation described above (step 1104: NO), the observation interval determination program 1012 proceeds to step 1105.

Next, the observation interval determination program 1012 lengthens the observation interval of the connection destination at a constant rate from a default value, for example (step 1105).

Next, the observation interval determination program 1012 incorporates the observation interval lengthened in step 1105 into the malicious website list 1015 (step 1106).

Next, the observation interval determination program 1012 adds 1 to the variable "i" and proceeds to step 1108 (step 1107).

Next, the observation interval determination program 1012 compares the variable "i" with the number of connection destinations that can be obtained by referring to the malicious website list 1015 (step 1108).

Here, if the variable "i" is less than the number of connection destinations (step 1108: NO), the observation interval determination program 1012 returns to step 1103.

On the other hand, if the variable "i" exceeds the number of connection destinations (step 1108: YES), the observation interval determination program 1012 terminates the process.

Note that the method of observation interval setting processing described with reference to FIG. 11 is an example, and as such is not limited thereto. For example, the observation interval may be shortened when there is a change in the observation results or external information.

Flow Example: Property Prediction

Figure 12:
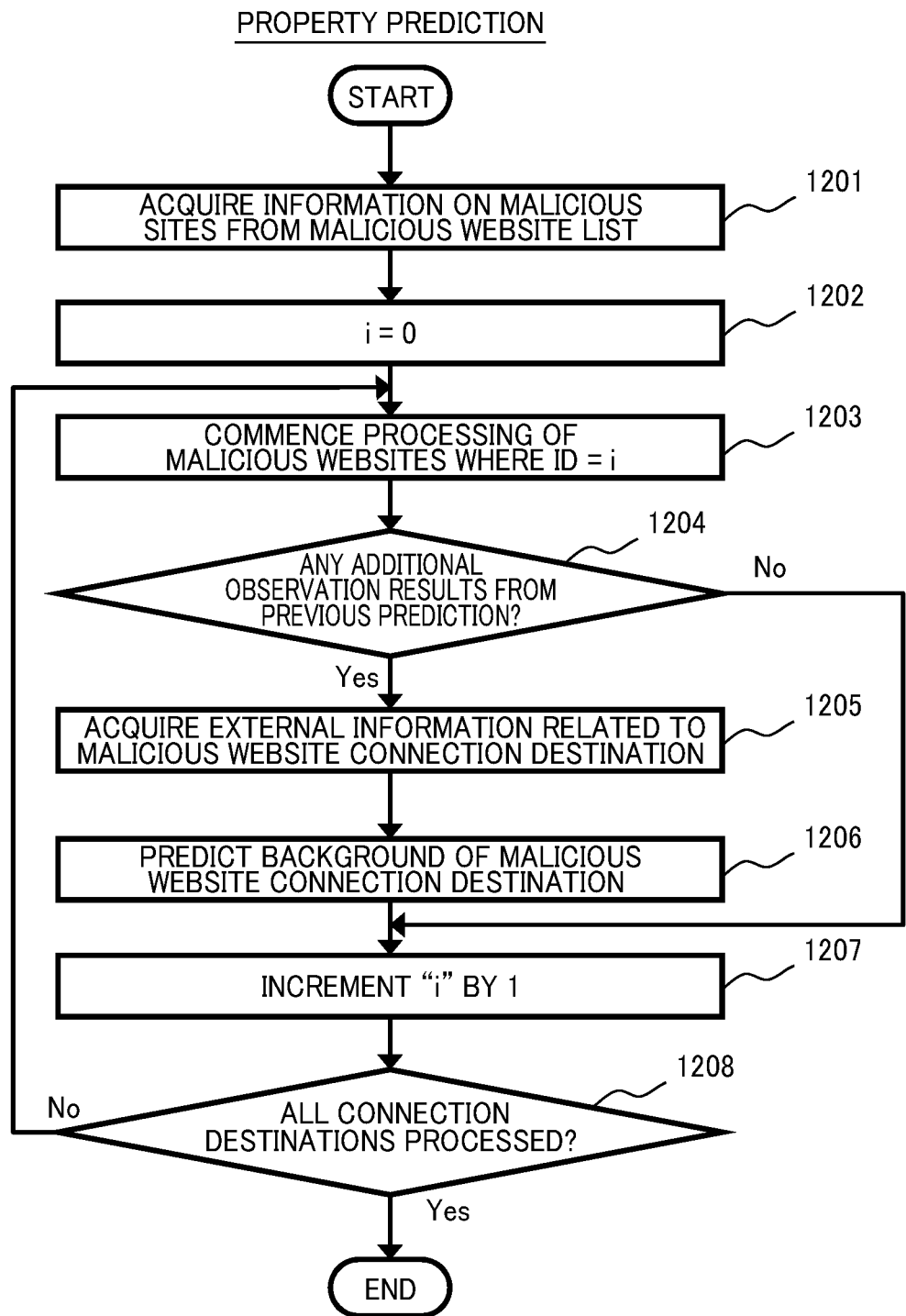
FIG. 12 is a flowchart illustrating a property prediction process according to the second embodiment of the present invention.

FIG. 12 is a flowchart illustrating an example of a property prediction process executed by the malicious website lifespan prediction system 1001 of the first embodiment.

Upon receiving an execution instruction from the user terminal 114, the property prediction program 1013 executed by the CPU 1003 starts the process described below.

The property prediction program 1013 acquires a list of connection destinations to be observed from the malicious website list 1015 (step 1201). Here, it is assumed that a list including entries composed of connection destination IDs is obtained.

Next, the property prediction program 1013 sets the initial value of the variable "i", which means the connection destination ID of the malicious website list 1015, to "0" (step 1202).

Next, the property prediction program 1013 starts processing the connection destination whose connection destination ID is i (step 1203).

Next, the property prediction program 1013 refers to the observation results storage area 1016 and confirms whether there are additional observation results from the previous prediction for the connection destination (step 1204).

As a result of this confirmation, if there are no additional observation results (step 1204: NO), the property prediction program 1013 terminates processing related to the connection destination and proceeds to step 1207.

On the other hand, if there are additional observation results as a result of the confirmation described above (step 1204: YES), the property prediction program 1013 proceeds to step 1205.

Next, the property prediction program 1013 acquires external information related to the connection destination (step 1205), such as WHOIS, DNS, certificate information, etc.

Next, the property prediction program 1013 applies the observation results obtained so far and the external information obtained in step 1205 to predetermined decision rules to predict the properties of the connection destination (step 1206). The properties here refer to, for example, a site whose content changes one after another in a short period of time, a site whose properties do not change at all, and the like. As an example of the decision rule described above, a determination engine obtained by machine learning regarding the relationship between the value of each item included in the observation results and external information and the nature of the malicious website can be assumed.

Next, the property prediction program 1013 adds 1 to the variable "i" and proceeds to step 1108 (step 1207).

Next, property prediction program 1013 compares the variable "i" with the number of connection destinations that can be obtained by referring to the malicious website list 1015 (step 1208).

As a result of the above comparison, if the variable "i" is less than the number of connection destinations (step 1208: NO), the property prediction program 1013 returns to step 1203.

On the other hand, if the variable "i" exceeds the number of connection destinations as a result of the confirmation described above (step 1208: YES), the property prediction program 1013 terminates the process Note that the property prediction processing method described with reference to FIG. 12 is an example, and as such is not limited thereto.

Flow Example: Background Prediction

Figure 13:
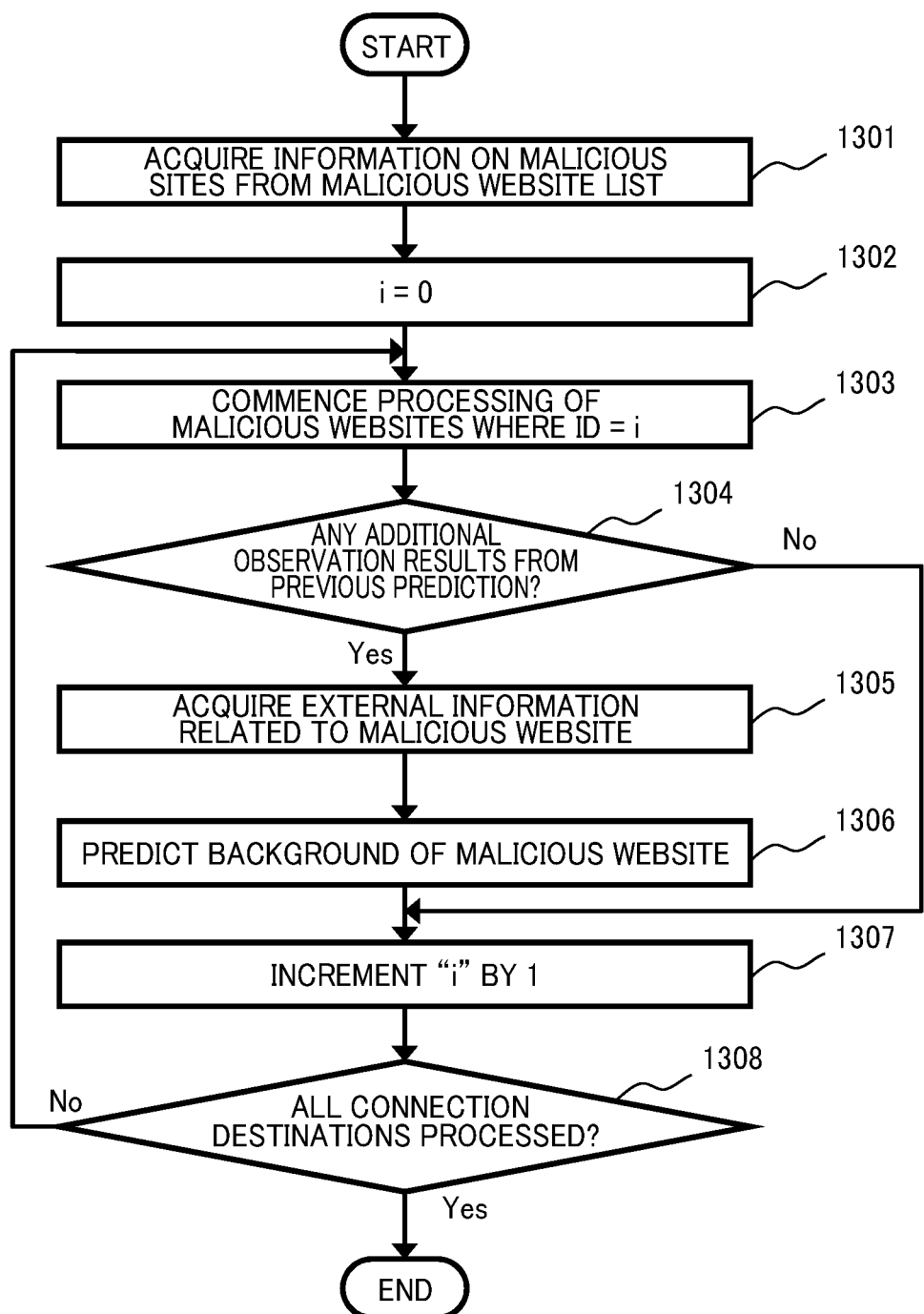
FIG. 13 is a flowchart illustrating a background prediction process according to the second embodiment of the present invention.

FIG. 13 is a flowchart illustrating an example of a background prediction process executed by the malicious website lifespan prediction system 1001 of the second embodiment.

The background prediction program 1014 executed by the CPU 1003 starts the process described below when an execution instruction is received from the user terminal 114.

The background prediction program 1014 acquires a list of connection destinations to be observed from the malicious website list 1015 (step 1301). Here, it is assumed that a list including entries composed of connection destination IDs is acquired.

Next, the background prediction program 1014 sets the initial value of the variable "i", which means the connection destination ID of the malicious website list 1015, to "0" (step 1302).

Next, the background prediction program 1014 starts processing the connection destination whose connection destination ID is i (step 1303).

Next, the background prediction program 1014 refers to the observation results storage area 1016 and confirms whether there are any additional observation results from the previous prediction for the connection destination (step 1304).

As a result of the confirmation described above, if there are no additional observation results (step 1304: NO), the background prediction program 1014 terminates processing regarding the connection destination and proceeds to step 1307.

On the other hand, if there are additional observation results as a result of the confirmation described above (step 1304: YES), the background prediction program 1014 proceeds to step 1305.

Next, the background prediction program 1014 acquires external information related to the connection destination (step 1305), such as WHOIS, DNS, certificate information, etc.

Next, the background prediction program 1014 predicts the background of the connection destination using the observation results obtained so far and the external information obtained in step 1305 (step 1306). The background here indicates, for example, an attack group or malware associated with the connection destination.

Next, the background prediction program 1014 adds 1 to the variable "i" and proceeds to step 1108 (step 1307).

Next, the background prediction program 1014 compares the variable "i" with the number of connection destinations that can be obtained by referring to the malicious website list 1015 (step 1308).

As a result of the above comparison, if the variable "i" is less than the number of connection destinations (step 1308: NO), the background prediction program 1014 returns to step 1303.

On the other hand, if the variable "i" exceeds the number of connection destinations (step 1308: YES), the background prediction program 1014 terminates the process (step 1308).

Note that the method of background prediction processing described with reference to FIG. 13 is one example, and the present invention is not limited thereto.

According to the second embodiment, the malicious website lifespan prediction system 1001 has an observation interval determination function, a property prediction function, and a background prediction function as support functions in addition to the malicious website lifespan prediction function similar to that of the first embodiment. This approach enables more sophisticated and labor-saving implementation of malicious website lifespan prediction and related list construction.

Third Embodiment

In a third embodiment, in addition to malicious website lifespan prediction on-premises, processing of a malicious website lifespan prediction system that enables cloud-based service provision by sharing determination results externally via a network is shown. The third embodiment is described below, focusing on the differences from the first embodiment.

Figure 14:
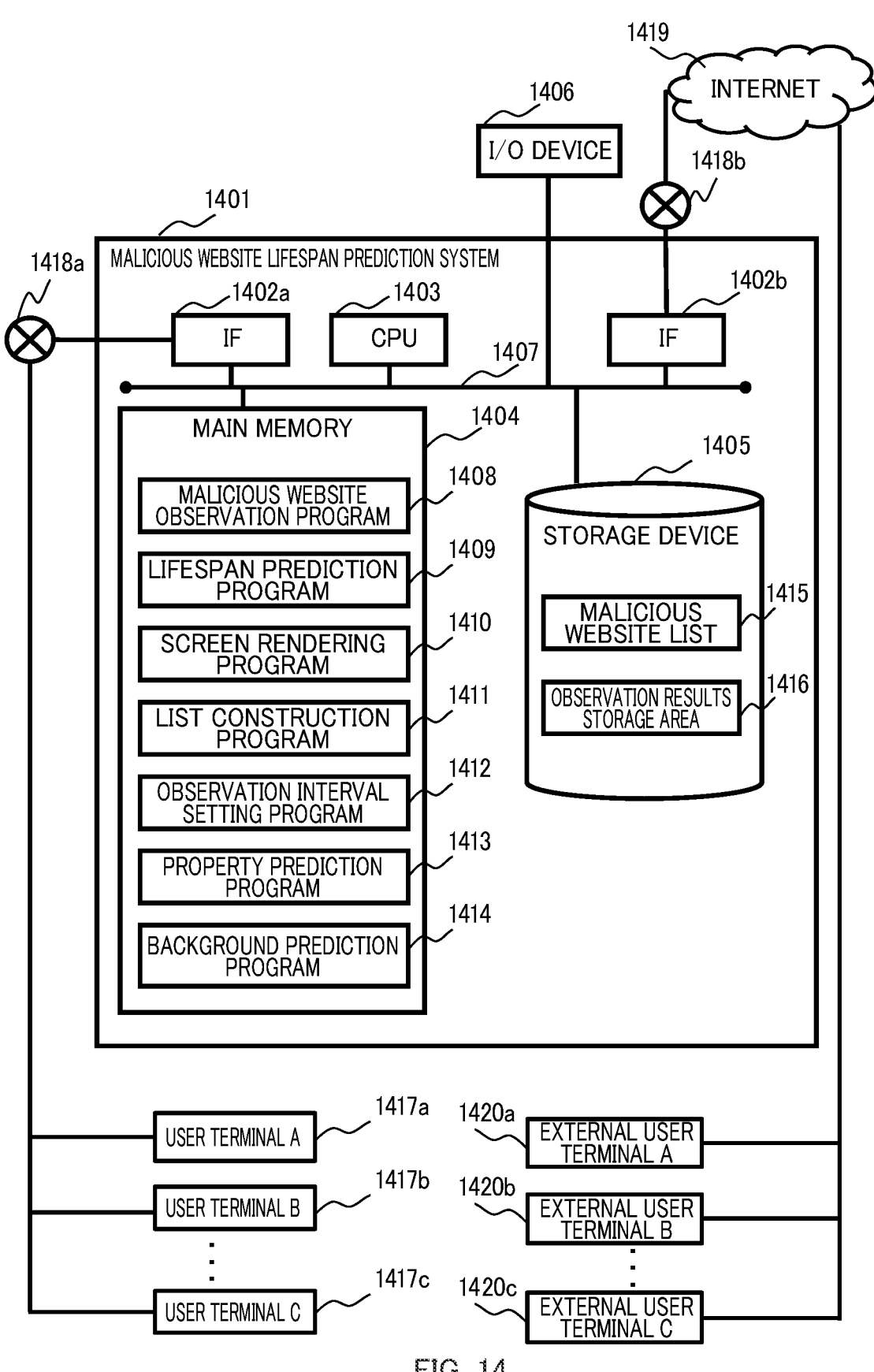
FIG. 14 is a diagram illustrating a configuration example of a malicious website lifespan prediction system according to a third embodiment of the present invention.

FIG. 14 is a diagram illustrating a configuration example of a malicious website lifespan prediction system 1401 according to the third embodiment of the present invention. The configuration of the computer system of the third embodiment is the same as that of the first embodiment.

The hardware configuration of the malicious website lifespan prediction system 1401 of the third embodiment can include an external user terminal 1420 in addition to the configuration of the second embodiment.

In the third embodiment, each program executes processing in response to requests from not only a user terminal 1417 within the network but also from an external user terminal 1420, and returns the results to the external user terminal 1420 via the Internet 1419. This approach makes it possible to provide services in the cloud.

The programs of the third embodiment are the same as those of the second embodiment. In addition, the processes executed by a malicious website observation program 1408, lifespan prediction program 1409, screen rendering program 1410, list construction program 1411, observation interval determination program 1412, property prediction program 1413, and background prediction program 1414 of the third embodiment are also the same as those of the second embodiment. The data structure of the third embodiment is the same as that of the second embodiment.

Note that the configuration of the malicious website lifespan prediction system 1401 according to the third embodiment described with reference to FIG. 14 is an example, and as such is not limited thereto.

According to the third embodiment, the malicious website lifespan prediction system 1401 provides the malicious website lifespan prediction function to internal users on-premises, as in the first and second embodiments, while also being able to provide the same information predicting the lifespan of malicious websites to external users via the Internet 1419. This approach makes it possible to provide services in the cloud.

Although the best mode for carrying out the present invention has been specifically described above, the present invention is not limited thereto, and can be variously modified without departing from the scope of the invention.

According to the present embodiments, by predicting the lifespan of a malicious website, it is possible to reduce the business cost and dependence on the construction/configuration of the blocklist and the watchlist.

From the description in this specification at least the following is clear: In the malicious website lifespan prediction system of the present embodiment, the arithmetic device outputs the observation results, the prediction results, and at least one of the blocklist and the watchlist to a predetermined device. Further processing may also be performed.

As a result, a person in charge of dealing with malicious websites can efficiently recognize a variety of information regarding the malicious website including the lifespan, thereby also enhancing the timeliness of countermeasures.

Further, in the malicious website lifespan prediction system of the present embodiment, in addition to the observation results, the arithmetic logic unit applies external information on a malicious website that is publicly available on the network to the decision rule, which may be used to predict the lifespan of the malicious website.

As a result, various information such as WHOIS and DNS, the domain, country, and owner of the malicious website, can be applied to the lifespan prediction algorithm, thereby effectively increasing the accuracy of the lifespan prediction.

Further, in the malicious website lifespan prediction system of the present embodiment, the arithmetic logic unit may also estimate the properties of the malicious website including the role of the malicious website based on the observation results and the external information, and the results of the prediction applied to the decision rule to predict the lifespan of the malicious website.

By doing so, based on an accurate understanding of the tendency of the lifespan to differ depending on its role, such as whether the sire is responsible for malware distribution or for management and command that instructs such malware over a certain period of time, it is possible to predict the lifespan with high accuracy.

Further, in the malicious website lifespan prediction system of the present embodiment, the arithmetic logic unit may also apply the observation results and the external information to a predetermined algorithm, predict an attack group or malware associated with the malicious website, and apply the prediction result to the decision rule to predict the lifespan of the malicious website.

By doing so, based on the source of operation of the malicious website, the country to which it belongs, the target system, service, past tendencies such as malware that is easily used, etc., the attack group of the malicious website and the malware used are predicted, such that the prediction accuracy of the lifespan is further improved.

Further, in the malicious website lifespan prediction system of the present embodiment, the arithmetic logic unit may generate a list of targets to be monitored or blocked according to the role of the malicious website indicated by the predicted lifespan.

By doing so, for example, sites responsible for malware distribution should be promptly blocked, and sites responsible for giving instructions to malware distribution sites should be monitored continuously, thus enabling lists to be generated accurately.

Further, in the malicious website lifespan prediction system of the present embodiment, the arithmetic logic unit may further execute a process of maximizing the blocklist or the watchlist based on the predicted lifespan and the resources available for blocking or observing the malicious websites.

By doing so, it is possible to create a situation in which the lists are efficiently generated and then utilized within the limits of the resources available for maintenance, management, etc., of the blocklist and the watchlist.

Further, in the malicious website lifespan prediction method of the present embodiment, the information processing apparatus may further execute a process of outputting the observation results, the prediction results, and at least one of the blocklist and the watchlist to a predetermined device.

Further, in the malicious website lifespan prediction method of the present embodiment, in addition to the observation results, the information processing apparatus may apply external information regarding the malicious website published on the network to the decision rule to predict the lifespan of the malicious website.

Further, in the malicious website lifespan prediction method of the present embodiment, the information processing apparatus may also predict the properties of the malicious website including the role of the malicious website based on the observation results and the external information, with the results of the prediction also applied to the decision rule to predict the lifespan of the malicious website.

Further, in the malicious website lifespan prediction method of the present embodiment, the information processing apparatus may apply the observation results and the external information to a predetermined algorithm to predict an attack group or malware associated with the malicious website, and apply the prediction result to the decision rule to predict the lifespan of the malicious website.

Further, in the malicious website lifespan prediction method of the present embodiment, the information processing apparatus may generate a list of targets to be monitored or blocked according to the role of the malicious website indicated by the predicted lifespan.

Further, in the malicious website lifespan prediction method of the present embodiment, the information processing apparatus may further execute a process of maximizing the blocklist or the watchlist based on the predicted lifespan and the resources available for blocking or observing the malicious websites.

DESCRIPTION OF REFERENCE NUMBERS

101 Malicious website lifespan prediction system
102 IF (communication equipment)
103 CPU (arithmetic logic unit)
104 Main memory
105 Storage device
106 Input/Output (I/O) device
107 Communication path
108 Malicious website observation program
109 Lifespan prediction program
110 Screen rendering program
111 List construction program
112 List of malicious websites
113 Observation results storage area
114 User terminal
115 Network
116 Internet

What is claimed is:

1. A malicious website lifespan prediction system comprising:
a communication device that accesses a network;
a storage device that stores information on malicious websites in the network; and
an arithmetic logic unit that
accesses each of the malicious websites,
observes a predetermined event at each of the malicious websites to generate observation results,
applies the observation results to a decision rule defining a relationship between a tendency related to the predetermined event at each of the malicious websites and a lifespan of each of the malicious websites to predict an estimated lifespan of each of the malicious websites, and
selects one or more predetermined malicious websites from among the malicious websites according and corresponding to the one or more estimated lifespans, and
generates a blocklist or a watchlist comprising each of the one or more predetermined malicious websites, wherein the blocklist or the watchlist associates an observation interval for each of the one or more predetermined malicious websites to reduce cost and dependence on the construction/configuration of the blocklist and the watchlist, wherein the arithmetic logic unit further executes a process of outputting at least one of the observation results, the prediction results, and the blocklist or the watchlist to a predetermined device.

2. The malicious website lifespan prediction system according to claim 1, wherein, in addition to the observation results, the arithmetic logic unit applies external information about the malicious website published on the network to the decision rule to predict the lifespan of the malicious website.

3. The malicious website lifespan prediction system according to claim 2, wherein the arithmetic logic unit predicts properties of the malicious website including a role of the malicious website based on the observation results and the external information, and applies the results of the prediction to the decision rule to predict the lifespan of the malicious website.

4. The malicious website lifespan prediction system according to claim 3, wherein the arithmetic logic unit applies the observation results and the external information to a predetermined algorithm, predicts attack groups or malware linked to the malicious website, and applies the prediction to the decision rule to predict the lifespan of the malicious website.

5. The malicious website lifespan prediction system according to claim 4, wherein the arithmetic logic unit generates a list of websites to be monitored or blocked according to the role of the malicious website indicated by the predicted lifespan.

6. The malicious website lifespan prediction system according to claim 5, wherein the arithmetic logic unit further executes a process of maximizing the blocklist or the watchlist based on the predicted lifespan and a resources available for blocking or observing malicious websites.

7. A malicious website lifespan prediction method using an information processing apparatus equipped with a communication device that accesses a network and a storage device that stores information on malicious websites in the network, the method comprising:
accessing each of the malicious websites,
observing a predetermined event at each of the malicious websites to generate observation results;
applying the observation results to a decision rule defining a relationship between a tendency related to the predetermined event at each of the malicious websites and a lifespan of each of the malicious websites to predict an estimated lifespan of each of the malicious websites; and
selecting one or more predetermined malicious websites from among the malicious websites according and corresponding to the one or more estimated lifespans, and
generating a blocklist or a watchlist comprising each of the one or more predetermined malicious websites,
wherein the blocklist or the watchlist associates an observation interval for each of the one or more predetermined malicious websites to reduce cost and dependence on the construction/configuration of the blocklist and the watchlist,
wherein the information processing apparatus further executes a process of outputting at least one of the observation results, the prediction results, and the blocklist or the watchlist to a predetermined device.

8. The malicious website lifespan prediction method according to claim 7, wherein, in addition to the observation results, the information processing apparatus applies external information about the malicious websites published on the network to the decision rule to predict the lifespan of the malicious website.

9. The malicious website lifespan prediction method according to claim 8, wherein the information processing apparatus predicts properties of the malicious website including a role of the malicious website of the malicious website based on the observation results and the external information, and applies the results of the prediction to the decision rule to predict the lifespan of the malicious website.

10. The malicious website lifespan prediction method according to claim 9, wherein the information processing apparatus applies the observation results and the external information to a predetermined algorithm, predicts attack groups or malware linked to the malicious website, and applies the prediction to the decision rule to predict the lifespan of the malicious website.

11. The malicious website lifespan prediction method according to claim 10, wherein the information processing apparatus generates a list of websites to be monitored or blocked according to the role of the malicious website indicated by the predicted lifespan.

12. The malicious website lifespan prediction method according to claim 11, wherein the information processing apparatus further executes a process of maximizing the blocklist or the watchlist based on the predicted lifespan and a resources available for blocking or observing malicious websites.

13. The malicious website lifespan prediction system according to claim 1, wherein the observation interval is shortened based on changes in the observation results or on external information.

14. The malicious website lifespan prediction system according to claim 1, wherein the observation interval represents a frequency with which a connection destination is observed for each of the one or more predetermined malicious websites.

15. The malicious website lifespan prediction system according to claim 1, wherein arithmetic logic unit calculates an elapsed time from an observation date and time of a connection destination to determine whether the observation interval has been reached for each of the one or more predetermined malicious websites.

* * * * *